United States Patent [19]
Liebermann et al.

[11] Patent Number: 5,790,402
[45] Date of Patent: Aug. 4, 1998

[54] SPREADING TABLE WITH ELECTRONIC SPLICE ZONE DISPLAY

[75] Inventors: Gabriel Liebermann, Hiawassee, Ga.; T. Clifton Penn, Richardson; Vernon R. Porter, Murphy, both of Tex.; Don Crockett, Westminster, Colo.

[73] Assignee: e-Z Max Apparel Systems, Inc., Helen, Ga.

[21] Appl. No.: 307,880

[22] Filed: Sep. 16, 1994

[51] Int. Cl.⁶ .................................................. G06F 19/00
[52] U.S. Cl. .................. 364/474.09; 83/365; 83/522.15; 83/936; 364/470.05
[58] Field of Search .......................... 364/470, 474.09, 364/474.13, 507, 470.01, 470.03, 470.05; 250/559.45, 559.46; 356/238, 429–431; 83/365, 371, 522.11, 522.15, 522.26, 936–941

[56] References Cited

U.S. PATENT DOCUMENTS

| | | | |
|---|---|---|---|
| 4,569,024 | 2/1986 | Reichert et al. | 364/474.13 |
| 4,583,181 | 4/1986 | Gerber et al. | 364/474.22 X |
| 4,887,219 | 12/1989 | Strauser | 364/474.13 X |
| 5,046,015 | 9/1991 | Dasher et al. | 364/474.09 |
| 5,074,178 | 12/1991 | Shetley et al. | 83/365 X |

*Primary Examiner*—Joseph Ruggiero
*Attorney, Agent, or Firm*—Kilpatrick Stockton LLP

[57] ABSTRACT

A row of light emitting diodes approximately one inch apart are mounted along the edge of a spreading table. A small computer reads a cut file which specifies (among other items) the splice zone locations. The computer then controls the lighting of appropriate LEDs to define the beginning and ending of these splice zones. Locations between the LEDs may be identified by lighting LEDs on either side of the appropriate location.

12 Claims, 2 Drawing Sheets

SPREADING TABLE WITH ELECTRONIC SPLICE ZONE DISPLAY

BACKGROUND AND SUMMARY OF THE INVENTION

The present invention relates to systems and methods used in mass producing garments, upholstery, or other situations where textile products are cut for subsequently sewing or other forms of assembly. More specifically, the invention provides a faster, cheaper, more reliable, and more flexible way to indicate splice zones and section boundaries to the spreading table operator.

Due to the rapid changes in garment styling, to seasonal shifts in consumer garments, to changing fashions, and to regional variations in taste, the mix of production is constantly changing, thus requiring great flexibility in manufacturing. However, one of the most significant costs in manufacturing is the cost of fabric, and an important component of profitability is the "yield," i.e. percentage of usable cloth actually made into garments. Thus, it is important that flexible manufacturing should not degrade yield.

These demands are normally reconciled by using computer layout operations. Once the particular production output mix is defined (by product planning or by incoming orders), a pattern layout is generated. Pattern layout specialists, using computer-automated-design tools, assemble a large number of shapes, in the correct mix of shapes and sizes for a particular production order, into a rectangular block of patterns. This rectangular block of patterns define knife cuts which will be made in a stack of cloth. The individual shapes are very closely packed, to maximize the efficiency of utilization of fabric. (A good layout specialist can typically reduce waste to 10% or so; a very good layout specialist may be able to reduce waste to 8% or so.) For efficient packing, the shapes are usually assembled in a fairly large section, e.g. 8 to 30 feet for a typical fabric width of 72 inches. The pattern sections are then assembled into a complete pattern for the full length of a single cut (i.e. the full length of the spreading table). The computer file which contains this complete pattern is often referred to as a "cut file".

Spreading

Fabrics (of the kinds used for volume manufacturing) are normally received in large bolts, e.g. 72 inches by 3000 feet long in a single roll. The first step in volume manufacture of garments is spreading. In this operation, bolts of fabric are unrolled onto a long table (e.g. 40-200 feet) to produce a multi-ply stack of cloth (e.g. 30-60 plies thick). This is performed by a self-propelled carrier which carries a bolt of cloth, and moves back and forth along the spreading table while unrolling the cloth without tension. (Thus alternate plies of cloth will be facing in different directions.)

Fabric as received from the mill normally contains a significant density of defects. Depending on the fabric type, the linear density of defects would typically be in the range from one per 50 feet to one per 200 feet. Some of these defects will be identified by metallic tags which the mills affix to the edge of the fabric, but some of these defects are only seen visually at the spreading table. Thus, the spreading operation requires an operator, who inspects the fabric as it is laid down.

Defects in the cut pieces are highly undesirable. While seamstresses may catch some defects, adding additional inspection to their duties would slow them down. (Moreover, since seamstresses are normally paid on a piecework basis, their motivation is economically directed to quantifiable output, i.e. to assembly rather than inspection.) Thus, defective pieces at the cutter output may lead to rejection of finished goods, or shipment of defective goods, both of which are highly undesirable.

To avoid this, the spreading operator must identify and cut out defects as the material is being spread on the table. However, it is important to do this economically. Thus, the close packing of the shapes in a section presents a problem: how can the spreading table operator cut out defects in such a way as to minimize material waste for a given cutting pattern? Having a layer of cloth end in mid-pattern piece causes waste as much as cloth cut out by the spreading table operator. Moreover, it is desirable to maintain the correct balance of required shapes if possible.

One well-known element of efficient manufacturing is the use of splice zones inside the long sections. Part of the layout specialist's work is to define zones where cuts can be made by the spreading table operator, and how much overlap is required. (Thus, each splice zone is defined by TWO lines: one line shows how far the previous piece of cloth must extend, and one line shows where the next piece of cloth must begin, i.e., how much overlay is needed.) Splices are made at section line boundaries and certain points along the spread that would result in the least amount of material being wasted. They are made when starting a new roll of fabric in operations where shade matching is critical and at flaw locations where a portion of the material must be discarded without losing any pieces as a result.

Another reason for using splices is to achieve proper shade matching, since the shade of fabric will often vary slightly from batch to batch. Therefore, where shade matching is critical, a splice will often be performed (usually at a section line) when starting a new roll of fabric. The disclosed innovative system can also indicate section lines or splice zones for splices of this type.

The splice zones define permissible cut locations in the computer-generated pattern; but how is the spreading table operator to relate this to the long pieces of cloth in front of him? This problem exists in both computerized and manual cutting operations. Manufacturers who cut multiple plies using automated or hand operated cutting knives use computer based equipment and software in order to make markers that are then plotted (printed) in long rolls of paper about 72" wide and often exceeding 100'. This paper is rolled out on the spreading table before spreading begins, and splice points are marked directly on the surface of the table (most often in chalk). Then the paper is rolled back up and the fabric is spread. When a flaw is encountered the spreader is stopped, the operator moves back to the nearest splice point, cuts the flaw out, and moves the spreader back to overlap the cut line with the required overlap.

An alternate method uses a printer that prints the splice points using a specialized thermal printer on long rolls of paper about 2" wide. This paper is then unrolled and taped to the edge of the table. Both of the above methods require paper as long as the spread, which will subsequently be discarded. When entire markers are plotted, the amount of paper used is phenomenal. This presents a dual environmental problem: not only is the production of paper a major source of depletion of our natural resources, it also contaminates the fabric making it at this time impractical to recover it due to the cost of separating and problems involved in separating it. As a result the majority of fabric waste from manufacturing is placed in landfills creating major problems due to the sheer bulk and chemicals in many dyes and artificial fibers.

Splice zones may be close to each other, or may even overlap. In the conventional splice-zone indicating tape structure, the lines which indicate splice zone boundaries are marked with arrows, so that the operator can see which lines define which splice zones.

The present invention provides a means for completely eliminating the need for printing splice tapes. Moreover, when combined with a parts identification system or labeler it eliminates the need for full-width paper markers (whose only other use is to identify pieces with printed annotations). It is important to note that without a practical splicing solution, (such as splice tape printers, splice reports, or the present invention) downstream part identification systems cannot eliminate 72" wide marking paper.

Instead of printing anything, the disclosed innovative system provides a row of equally spaced Light Emitting Diodes (LEDs), which are permanently attached to the spreading table. The splice zone and section boundary data, derived from the cut file, is used to indicate splice zone locations directly to the operator (by lighting LEDs along the edge of the table) for each particular cut file. By using the appropriate logic and electronics to control the LEDs (as described below), the splice zone boundaries corresponding to a particular cut file are electronically displayed. This eliminates all handling and creation of paper, as well as the expensive and maintenance-intensive equipment required for plotting on 72" wide paper. Such wide plotters are expensive and very complex machines. By contrast, the present invention has no moving parts, is easy to service, and is modular so that defective parts can be easily replaced.

Thus, the innovative system replaces full size markers, splice tape and other methods for splicing fabric during the spreading process.

SUMMARY OF THE INVENTION

The purpose of this invention is to replace the time consuming generation and printing of the paper tape and the eliminate the expensive computer printer and the paper tape with a novel computer controlled measuring strip containing display devices, such as light emitting diodes (LEDs), liquid crystal displays, electroluminescent devices or other such display devices.

For ease of description, assume that LEDs are placed in a long linear array at a spacing of 1 inch. For a 100 foot table that would be 1200 LEDs. While technically feasible to drive these LEDs in any combination desired, the cost of 1200 electronic switches to control them would be prohibitive for most applications. This invention teaches methods of driving these LEDs at desired points at reasonable cost.

A problem also arises if all the LEDs are lit that correspond to the splice marks shown in FIG. 1. There would be no distinguishing difference between any of the splice marks. All the splice marks and section marks would look the same so the beginning and ending of each splice could not be determined.

This invention teaches several novel means of effecting the identification of these different fiducial symbols.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
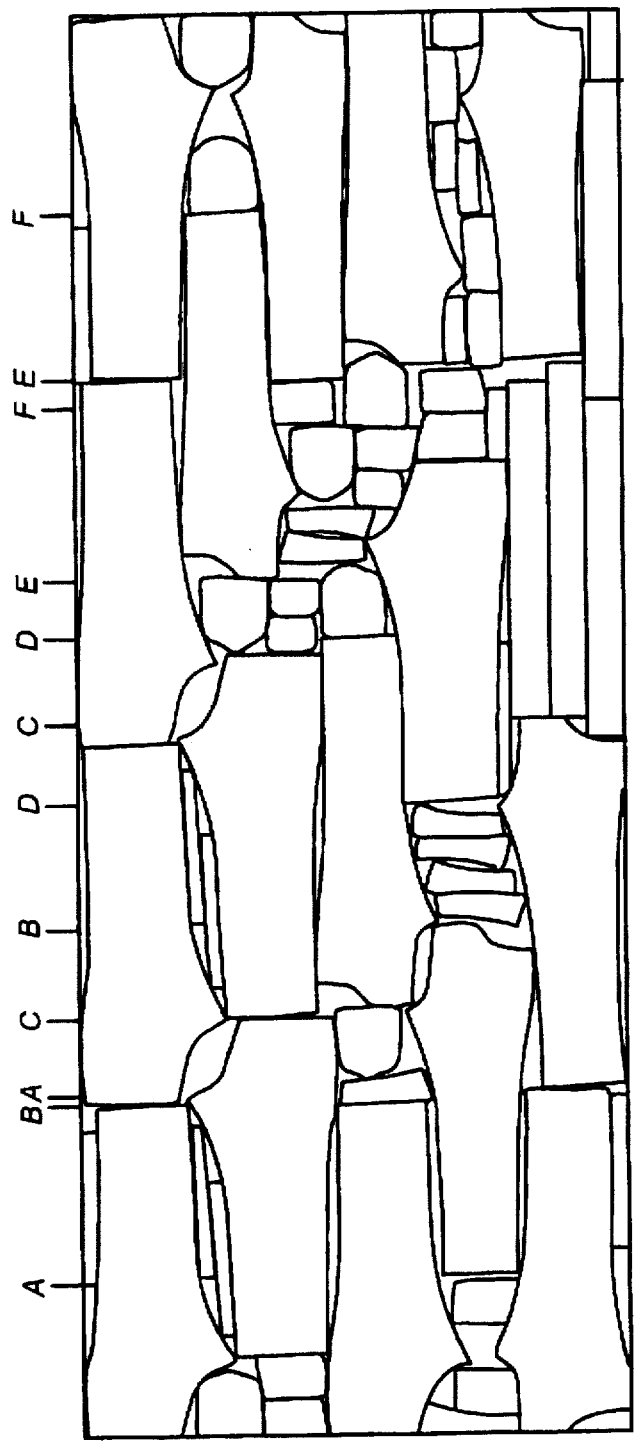
FIG. 1 shows an example of a pattern section. Note that this starts from a straight edge at one end of the block, but thereafter there is no straight line between shapes until the end of the section. Examples of typical splice line within the section are shown.
Figure 2:
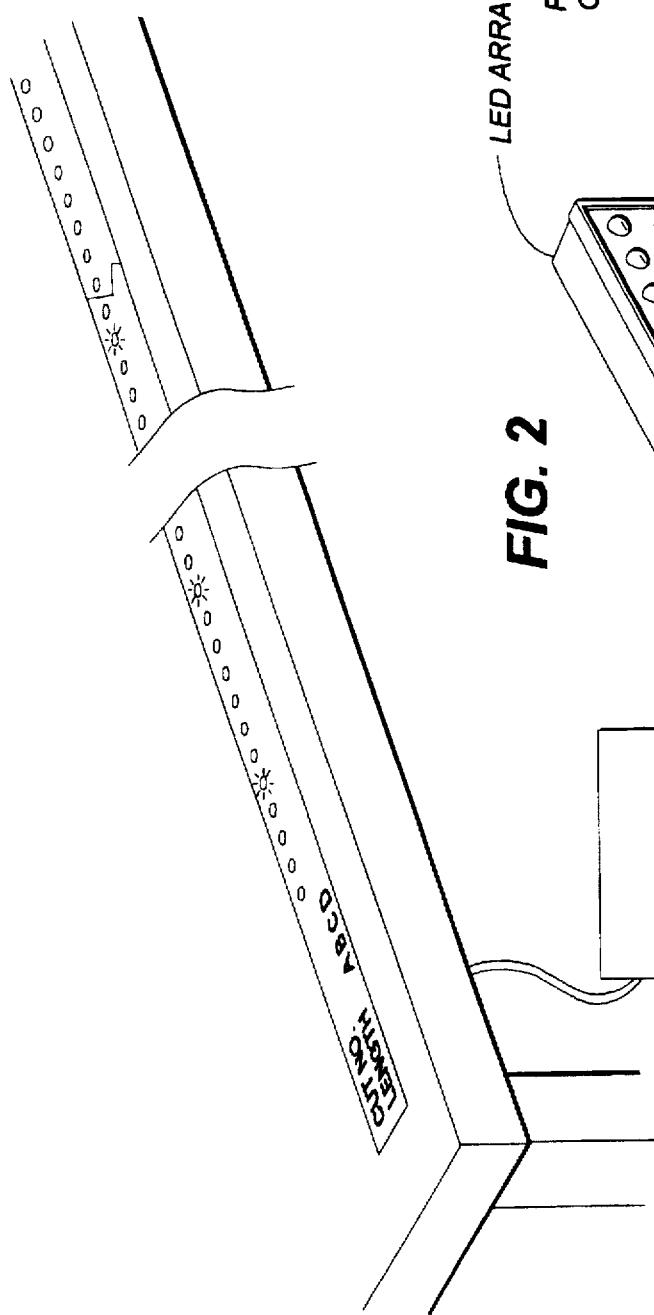
FIG. 2 shows one example of the presently preferred embodiment of the invention as installed on a spreading table.

The present invention provides a row of optoelectronic indicator (preferably LEDs) equally spaced along the length of the spreading table (e.g. FIG. 2). With appropriate logic, electronics, and software, as described below, the LEDs are controlled to display the splice points directly along the edge of the spread.

In the currently preferred embodiment, the strip of LEDs is spaced at 1". This strip can be packaged in a low profile extrusion or alternatively, holes may be drilled in the top of the table for mounting the LEDs, with the wiring being placed underneath the table. Thus the system can become a standard part of spreading tables as they are made or can be retrofitted to existing systems. The strips of LEDs, along with their microcontroller and associated wiring are manufactured in 5' lengths, in the presently preferred embodiment, to create an easily replaceable module.

The system, in the presently preferred embodiment, is driven by a PC, which can read previously generated cut files and generate splice points to be displayed. Splice points to be down loaded can also be accepted from splice reports that many other systems generate and even from the print file which is generated by other systems to create a printed splice tape.

Each system contains a built in buffer where once the splice information for a cut has been down loaded it is stored on the system freeing it from the PC it is connected to. This provides a redundancy that allows continuing the operation quickly if either of the two somehow lose their data.

In the presently preferred embodiment, a small LCD display is provided at one end of the spreading table, so that the current cut number, spread length and other relevant information can be displayed (usually two 20 character lines are adequate). This adds only a small amount of cost, while providing valuable insurance against errors. Alternatively, more copies of this display can be added if desired.

Although, in the presently preferred embodiment, the LEDs are spaced at 1" intervals, a finer resolution can be achieved by lighting pairs of adjacent LEDs. When the LED spacing is 1", ½" resolutions can be achieved by alternately flashing two LEDs to indicate that the mark belongs in the center. In alternative embodiments, ¼" or even finer resolutions can be achieved with this same physical layout, by flashing one side faster than the other or in a different pattern. Of course, closer or further spacing of the physical LEDs may be used in some applications, depending on accuracy requirements.

Electronic Splice Zone Display

The present invention provides a means for completely eliminating the need for printing splice tapes. Moreover, when combined with a parts identification system or labeler, it eliminates the need for large paper markers whose only other use is to identify pieces with annotation that is printed on each one. It is important to note that a practical splicing solution (such as splice tape printers, splice reports or the present invention) is an important step (with downstream part identification systems) in eliminating the use of 72" wide marking paper.

The system can be most easily understood by thinking of it as an electronic replacement for splice tape or markers in the spreading process. This eliminates all handling and creation of paper, as well as the cost of the equipment required to print on it. Maintenance costs of 72" wide plotters are high. The present invention has no moving parts, is easy to service, and is modular (so that defective sections can be easily replaced).

Operation

The use of the electronic splice zone display is simple. First, the appropriate cut file is transferred to the system for processing; the file is processed and splice points and section lines are extracted. The splice data is assigned to a spreading table, where the LED lights display splice points and section marks: Spreading is ready to begin.

Processing Cut Files

The program, in the presently preferred embodiment, uses files that have been produced on a marking system such as the AM 1, AM 5, Accumark and other systems that have Gerber compatible file output capabilities. The files may be in either EBCDIC or ASCII format, but must, in the presently preferred embodiment, include either pen annotation D codes or Labeler letter codes providing size and piece name annotation.

Once the operator starts the program, a screen is displayed which contains the files available for running. The user may select one or more files for processing by using the up and down arrow keys on the keyboard to highlight them on the screen; if more than one file is selected, the order in which the files are selected will be the order that they will be processed. The process may be interrupted at any time to change the order of the files remaining to be processed.

Once processing is complete the screen displays the files processed and a report of errors if any encountered in processing.

Setting the Origin Point

When starting with the first file, the operator selects it and any subsequent files he wishes to process as described above. He then enters the distance he intends to start spreading the fabric at. This is the distance from the end of the table to the start point of the spread. A prompt asks for the direction you will be spreading in. The default for this value can be set if the user regularly starts at the same point. Processing of the files then begins. A report including the Cut number and other relevant data will be displayed for visual confirmation that this is the proper file.

Operating at the Spreader

The operation of the system once the appropriate file is enabled at the spreading table is the same as with splice tape or marks made from unrolling a full scale marker and manually marking the splice points for each spread. The LEDs being spaced 1" apart provide an accuracy up to that point. ½" accuracy can be achieved where the system lights two LEDs for each splice location and flashing the one closest to the center of the splice. Section marks are continually on and it is easy to discern the difference between splice and section marks. The lights simply represent splice points and section marks as with splice tape or manual methods. Once the appropriate file is loaded the spreader operator proceeds normally in spreading. Upon encountering a flaw it is easy to use the lights as guides to select the nearest splice location or section mark.

Advantages

One important advantage is that this invention avoids the disastrous possibility that the spread operator will use the wrong tape to indicate splice zones. It also speeds up the spreading operation, since the operator does not have to spread and collect the paper tapes. This also reduces environmental impact, since elimination of the paper tapes reduces the burden of trash disposal. This also reduces cost, since the very significant cost of the paper tapes can be eliminated.

Another advantage is elimination of the need for printing over more than 100,000 feet of thermal paper per spreading table per year. This provides significant benefits in cost reduction and reduced environmental impact.

Another advantage is faster operations, since there is nothing to carry to the spreading table, no need to mark off the spreading table, and no waiting on printers or plotters.

Further Modifications and Variations

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

LEDs are used for the light emitters in the presently preferred embodiment. Alternatively, these can be incandescent, which have more "memory". Also alternatively, these can be electroluminescent or any other emitter.

In an anticipated further embodiment, multiphase flashing of the LEDs is used to unambiguously indicate splice zone boundaries even when they are overlapping. Alternatively, multicolor LEDs or multiple LEDs at each location could be used instead of the multi-phase flashing to designate different splice zones.

Figure 3:
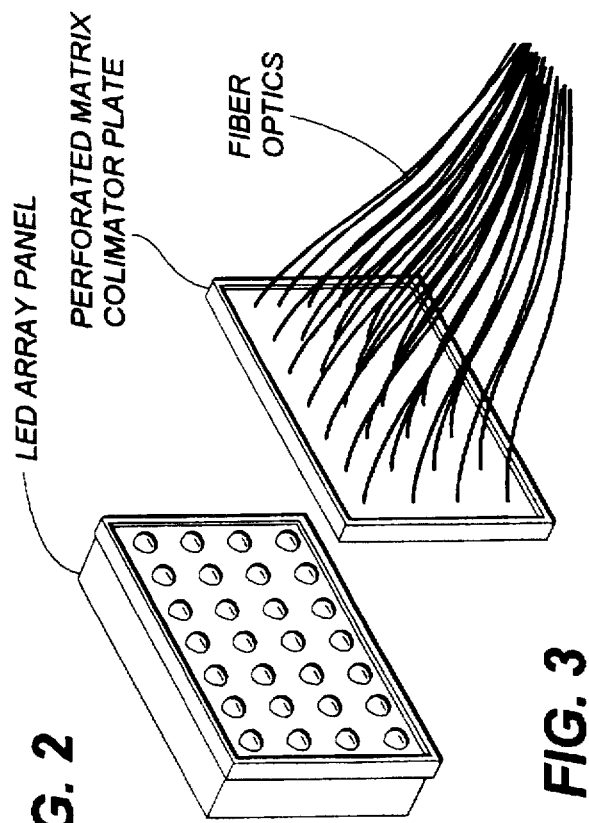
FIG. 3 shows an alternative embodiment in which an 8×8 array of lights are connected to fiber optics which transmit the light to appropriate locations on the table.

A further significantly different class of embodiments uses a quite different approach to achieve electronically updated visual representation of splice zone information. In this class of embodiments an imaging head is carried on the spreading carriage itself, and images the splice zone information onto a strip of the table (e.g. FIG. 3). The spreader carriage includes an encoder wheel (or other position-sensing mechanism) to provide accurate location for the splice zone display. (Preferably a long-persistence phosphor is used for this strip, to provide some residual indication even when it is not being actively illuminated. Preferably an IR-blocking overlay is used over the phosphor, so that the active phosphor sites are not erased by ambient infrared light, but can be erased by a strong IR source.) The imaging head may be a combination of a display with a projection lens, or may be a steered laser pointer, or a projection of symbol masks, or may be implemented in other ways. Preferably such imaging heads are provided on both sides of the spreader, for versatility. This alternative class of embodiments can use software very similar to that of the presently preferred embodiment.

As will be recognized by those skilled in the art, the innovative concepts described in the present application can be modified and varied over a tremendous range of applications, and accordingly the scope of patented subject matter is not limited by any of the specific exemplary teachings given.

What is claimed is:

1. An electronic splice zone display for a fabric spreading table, comprising:
    a row of electronic light emitters mounted in fixed positions along one edge of said spreading table; and
    programmable electronics connected to read a cut file containing data identifying the locations of splice zones, each of which have a starting location and an ending location, and connected and configured to activate individual ones of said light emitters, in multiple phases, at respective positions corresponding to said starting and ending locations, in a pattern such that adjacent splice zones are not activated in the same phase.

2. An electronic splice zone display as in claim 1, wherein said light emitters are light emitting diodes.

3. An electronic splice zone display as in claim 1, wherein said programmable electronics turns on a contiguous pair of said light emitters simultaneously to indicate that a splice location is between said contiguous pair of light emitters.

4. An electronic splice zone display as in claim 1 wherein said light emitters are spaced one inch apart.

5. An electronic splice zone display as in claim 1, wherein a starting location for a first splice zone and an ending location for a second splice zone are the same.

6. An electronic splice zone display as in claim 3, wherein a known pattern of blinking in said contiguous pair of light emitters is used to indicate a known location between said contiguous light emitters.

7. An electronic splice zone display for a fabric spreading table, comprising:
    a row of light emitting diodes mounted in fixed positions along one edge of said spreading table; and
    programmable electronics connected to read a cut file containing data identifying the locations of splice zones, each of which have a starting location and an ending location, and connected and configured to activate individual ones of said light emitting diodes at positions corresponding to said starting and ending locations.

8. An electronic splice zone display as in claim 7, wherein light emitting diodes in said row of light emitting diodes are spaced one inch apart.

9. An electronic splice zone display as in claim 7, wherein a starting location for a first splice zone and an ending location for a second splice zone are the same.

10. An electronic splice zone display as in claim 7, wherein a contiguous pair of light emitting diodes are turned on simultaneously to indicate that said starting location or said ending location is located between said contiguous pair of light emitting diodes.

11. An electronic splice zone display as in claim 7, wherein a known pattern of blinking in said contiguous pair of light emitting diodes is used to indicate a known location between said contiguous pair of LEDs.

12. A method for spreading fabric, comprising the steps of:
    (a.) loading a file of cut file data into a computer;
    (b.) extracting said cut file data to obtain a location for splice zones and section boundaries; and
    (c.) lighting a plurality of LEDs which correspond to said location for each said splice zones and said section boundaries.

* * * * *